Jan. 25, 1949.  G. A. LYON  2,459,889
PLASTIC COVER FOR AUTOMOBILE SEATS
Filed May 14, 1945

Inventor
GEORGE ALBERT LYON

Patented Jan. 25, 1949

2,459,889

UNITED STATES PATENT OFFICE 2,459,889

PLASTIC COVER FOR AUTOMOBILE SEATS

George Albert Lyon, Allenhurst, N. J.

Application May 14, 1945, Serial No. 593,664

6 Claims. (Cl. 155—179)

This invention relates to a cover for a seat which may be either in the form of a detachable replaceable cover or may be in the form of a permanent upholstery-like covering for a seat. More particularly, my invention relates to a one piece plastic cover especially adapted for use with automobile vehicle seats.

An object of this invention is to provide a covering for a seat which will always have a smooth neat appearance and in which wrinkles are automatically eliminated by reason of the inherent characteristics of the covering.

Another object of this invention is to provide a seat covering which can be pre-formed in a given self-sustaining shape and applied bodily to the cooperating portions of the seat.

Still another object of the invention is to provide a pre-formed plastic covering for a seat which includes portions adapted to automatically yield when the seat is occupied and to spring back to their original contours upon release of pressure so that the covering in use always appears to be smooth and neat.

Yet another object of this invention is to provide a plastic covering for a seat which lends itself readily to cleaning and which is of a highly sanitary character.

Another and further object of the invention is to provide a covering for a seat which lends itself to fabrication on a large production scale and which not only may be economically made but also may be applied with great ease to seat structures without any substantial changes in the seat.

A further object of the invention is to provide a seat covering of more lasting shape and appearance and which may be made in a great many ranges of colors and color combinations.

In accordance with the general features of this invention there is provided a cover for seats such as in automobiles and the like which includes a seat part proper and a back part, the cover comprising integral portions made of resiliently flexible form-sustaining plastic material shape to conform generally with the seat and back parts and also including edge portions bulged away from the extremities of the back and seat parts which bulged portions will yield outwardly upon occupancy of the seat but will spring back to their original contours without deformation upon release of pressure so that the cover is always smooth and neat appearing.

Another feature of the invention relates to the forming of the bulged portions in the aforesaid cover by undercutting marginal portions of the seat cover and which marginal portions may be suitably attached by any conventional or satisfactory means to the edges of the seat and back parts proper being covered.

Other objects and features of this invention will more fully appear from the following detailed description taken in connection with the accompanying drawings which illustrate several embodiments thereof, and in which.

As shown in the drawings.

I have illustrated in the accompanying drawings a more or less conventional type of automobile seat to which my plastic cover is applied. It is, of course, clear, however, that the invention is not limited to the particular shape of the seat but may be used with equal advantage with many different shapes and contours of seats such as are used in automobiles, vehicles, airplanes and the like. My invention can also be applied to great advantage to furniture of the outdoor type since if a water-resistant plastic is used the covering will not only serve to ornament the seat but will also serve to protect it from the elements.

Figure 2:
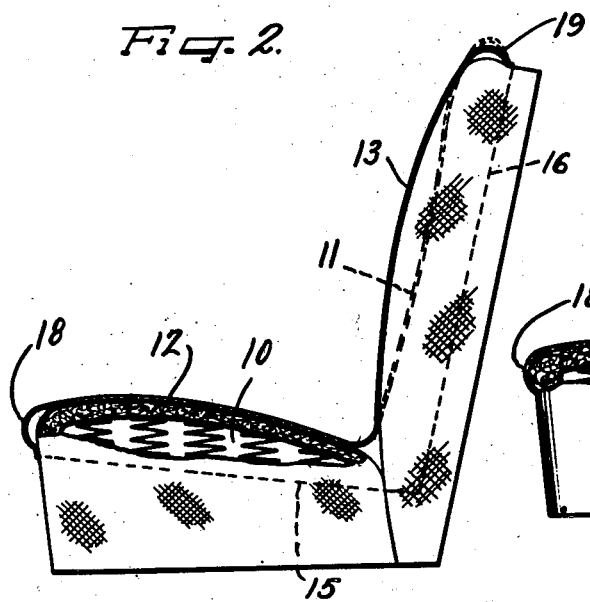
Figure 2 is an end view of the structure shown in Figure 1 with a portion broken away to show how the covering hugs the seat proper.

As best shown in Figure 2, the seat embraces a seat portion proper designated by the reference character 10 and a back part 11. These parts, as is customary, are angularly arranged with respect to each other and may be of any suitable spring and cushion construction.

The plastic cover for this seat comprises two angular portions 12 and 13 which follow very closely the external contours of the seat and back parts 10 and 11. These portions 12 and 13 are pre-formed in the desired angular relationship and are made of such plastic material that they are self-sustaining as to this pre-formed shape.

The portions 12 and 13 of the covering include marginal flange portions 15 and 16 which extend around the base of the seat 10 and the margin or skirt of the back 11. The angular cover is self-sustaining as to its angular shape and is adapted to be snapped over the seat and back portions 10 and 11. In applying the cover the edges of the flanges 15 and 16 are adapted to be stretched or expanded over the edges of the seat and back portions 10 and 11. Moreover the inclination of the sides of the base and back of the seat itself assists in keeping the cover on the seat.

Inwardly of the margins of the covering portions I purposely provide the covering with a peripheral bulge 18—19. This bulge is on each of the portions 12 and 13 and is adapted to resiliently yield outwardly when the seat is subjected to pressure by reason of occupancy. I have illustrated by dotted lines how one of these peripheral bulges 19 will yield as shown in Figure 2 when the back covering portion 13 is depressed inwardly. However, upon release of pressure, the bulge immediately springs back to its original contour. The advantage of this arrangement is that I am enabled to take up the excess material due to the flexure of the normally convex seat covering portion without the occurrence of any permanent wrinkles or deformations in the covering portions. Thus the portions 12 and 13 are always smooth in appearance and will not tend to buckle or crack in use. This enables the cover to have a much more lasting usage.

Figure 1:
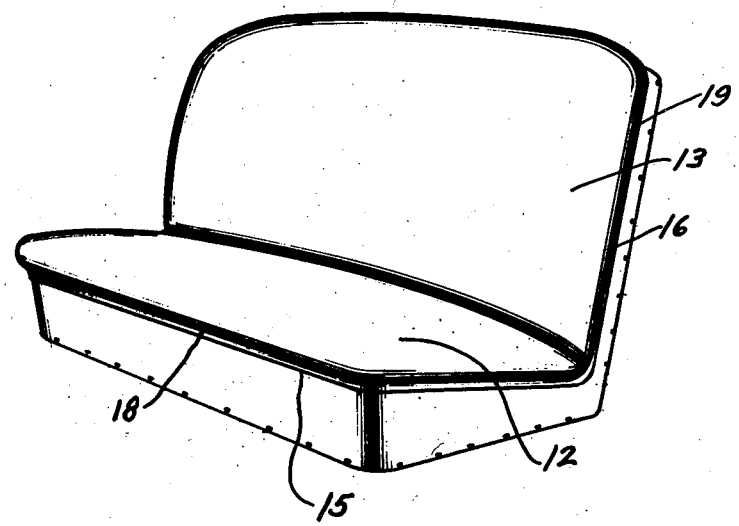
Figure 1 is a generally perspective view of a seat having my novel cover applied thereto.
Figure 3:
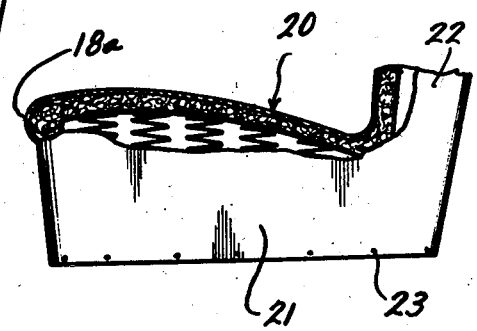
Figure 3 is a fragmentary view partly in section of a modified form of the invention wherein the covering is built in as a part of the seat rather than being in the form of a detachable cover as shown in Figures 1 and 2.

While in Figures 1 and 2 I have illustrated my cover as being a detachable one for covering the upholstery of an existing seat, I fully contemplate that the covering may in itself be the upholstery for the seat. I have designated such an alternative form of the invention by the reference character 20 in Figure 3. In this form, the plastic cover 20 is secured to the seat proper as a permanent part thereof and includes full skirts 21 and 22 for embracing the side flanges of the seat proper. In both forms fastening elements 23, such as tacks, screws, snap fasteners or the like may be used to positively fasten the side flanges of the cover to the seat if such fastening is desired.

Also, the plastic cover 20 may be provided with the peripheral bulges such as the bulge 18a which, however, in this form may be normally filled with a material of the seat. However, upon flexure of the seat by reason of occupancy, the bulge will yield outwardly in the same manner as the bulges 18 and 19.

Both forms of my invention may be pre-formed in a given shape from suitable plastic material such, for example, as synthetic plastic. Excellent results may be obtained by using a plastic material such, for example, as ethyl cellulose or a vinyl resin. Cellulose acetate may also be used, but a plastic should preferably be employed which will have the requisite resiliency to enable it to return automatically to its original contour after flexure. It is the mushroom-like effect due to the bulges in the plastic cover that enables the cover to yield when deflected without permanently wrinkling or buckling the plastic. Hence it will be appreciated that the plastic must be of a form-sustaining but resiliently deflectable material.

The plastic employed may be of different colors and in fact the back and seat portions may be colored differently if it is so desired so as to obtain different contrasting color effects.

Any suitable equipment may be employed for pre-fabricating the plastic although it is contemplated that the shaping of the plastic must be effected under heat so that a proper set of the plastic is accomplished.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A cover for seats such as an automobile seat and the like which includes a seat proper and a back part, said cover comprising integral portions made of sheet thin resiliently pliable form-sustaining plastic material shaped to conform generally with said seat and back parts and also including edge portions bulged away from the extremities of the back and seat parts and which bulged portions will yield outwardly upon occupancy of the seat but will spring back of their own accord to their original contour without deformation upon release of pressure on the seat and back parts.

2. A cover for seats such as an automobile seat and the like which includes a seat proper and a back part, said cover comprising integral portions made of sheet thin resiliently pliable form-sustaining plastic material shaped to conform generally with said seat and back parts and also including edge portions bulged away from the extremities of the back and seat parts and which bulged portions will yield outwardly upon occupancy of the seat but will spring back of their own accord to their original contour without deformation upon release of pressure on the seat and back parts, said seat portions having their margins beyond the bulged portions provided with means for attaching the cover to the automobile seat.

3. As an article of manufacture, a seat covering of pre-formed plastic sheet material having its margins turned down and undercut in form so as to resiliently yield in use and to spring back to its original contour upon release of pressure without any deformation of the same.

4. The article of claim 3 further characterized by the covering including both integral seat and back portions and with the undercut extending clear around so that the edges of the covering around the seat and back portions is bulged slightly outwardly and which bulged portions give way when the seat is subjected to the pressure of a person occupying the same.

5. As an article of manufacture a seat covering of pre-formed plastic sheet thin material self-sustaining as to form and resiliently yieldable in use without permanent deformation, said covering including a seat portion yieldable downwardly upon occupancy thereof and springable back of its own resiliency to its original contour upon release of the deflecting pressure, said covering including marginal skirt portions adapted to be stretched over the sides of the seat whereby the covering may be snapped thereon.

6. A cover for seats such as automobile seats and the like which include cushioned load-sustaining and side wall portions, said cover comprising a sheet thin panel of resiliently pliable form-sustaining plastic material shaped to conform generally with the load sustaining portion of a seat and including marginal flanges extending beyond said load-sustaining portion and turned for engagement at their extremities with the side portions of the seat, said marginal flanges being bulged outwardly adjacent the juncture with said panel and affording a springy connection resiliently yieldable upon the imposition of a deflecting load upon said panel toward said load-sustaining portion of the seat, whereby to accommodate said deflections without substantially disturbing the engagement of the extremities of said marginal flanges with said side portions of the seat.

GEORGE ALBERT LYON.

REFERENCES CITED

The following references are of record in the file of this patent:

UNITED STATES PATENTS

| Number | Name | Date |
|---|---|---|
| 434,495 | Woods | Aug. 19, 1890 |
| 536,538 | McIntire | Mar. 26, 1895 |
| 687,741 | Gilger et al. | Dec. 3, 1901 |
| 1,527,249 | Chapman | Feb. 24, 1925 |
| 1,853,617 | Hutchcroft | Apr. 12, 1932 |
| 1,942,296 | Killen | Jan. 2, 1934 |
| 2,281,341 | Turner | Apr. 28, 1942 |
| 2,308,964 | Saurer | Jan. 19, 1943 |
| 2,354,436 | Stedman | July 25, 1944 |

FOREIGN PATENTS

| Number | Country | Date |
|---|---|---|
| 28,119 | Great Britain | 1896 |